US012773720B2

(12) United States Patent
Clement et al.

(10) Patent No.: US 12,773,720 B2
(45) Date of Patent: Oct. 27, 2026

(54) DECORATIVE PANEL

(71) Applicant: UNILIN, BV, Wielsbeke (BE)

(72) Inventors: Benjamin Clement, Waregem (BE); Sam Ledegen, Ghent (BE); Marijn Seynaeve, Moen (BE)

(73) Assignee: UNILIN, BV, Wielsbeke (BE)

( * ) Notice: Subject to any disclaimer, the term of this patent is extended or adjusted under 35 U.S.C. 154(b) by 195 days.

(21) Appl. No.: 18/697,854

(22) PCT Filed: Oct. 4, 2022

(86) PCT No.: PCT/IB2022/059447
§ 371 (c)(1),
(2) Date: Apr. 2, 2024

(87) PCT Pub. No.: WO2023/057887
PCT Pub. Date: Apr. 13, 2023

(65) Prior Publication Data

US 2024/0399415 A1 Dec. 5, 2024

(30) Foreign Application Priority Data

Oct. 7, 2021 (BE) .................................. 2021/5783
Jul. 1, 2022 (BE) .................................. 2022/5540

(51) Int. Cl.
*B05D 7/00* (2006.01)
*E04F 15/02* (2006.01)
*E04F 15/10* (2006.01)

(52) U.S. Cl.
CPC .............. *B05D 7/57* (2013.01); *E04F 15/105* (2013.01); *B05D 2210/00* (2013.01);
(Continued)

(58) Field of Classification Search
CPC .......................................... E04F 15/00–15/225
See application file for complete search history.

(56) References Cited

U.S. PATENT DOCUMENTS

2002/0189183 A1* 12/2002 Ricciardelli ............ E04F 15/02 52/311.1
2016/0289979 A1* 10/2016 Tian ......................... C09D 7/61
(Continued)

FOREIGN PATENT DOCUMENTS

EP 1304427 A2 * 4/2003 ........ E04F 15/02005
EP 2189282 A1 5/2010
(Continued)

OTHER PUBLICATIONS

Cadogan et al. “Plasticizers”, Ullmann’s Encyclopedia of Industrial Chemistry, (2000); pp. 599-618.*
(Continued)

*Primary Examiner* — Prashant J Khatri
(74) *Attorney, Agent, or Firm* — Workman Nydegger

(57) ABSTRACT

A decorative panel includes a substrate and a wear layer. The wear layer has a varnish coat that includes hard particles over its entire thickness. The hard particles have an S50 particle size determined from the cumulative particle size distribution according to volume measured by laser diffraction as the particle size at which 50% of the hard particles are smaller than this particle size S50. The varnish coat has a thickness T that is between 0.5*S50 and 2*S50.

14 Claims, 4 Drawing Sheets

(52) U.S. Cl.
CPC ...... *B05D 2501/00* (2013.01); *B05D 2601/20* (2013.01); *E04F 15/02038* (2013.01)

(56) References Cited

U.S. PATENT DOCUMENTS

| | | | | |
|---|---|---|---|---|
| 2016/0289980 | A1* | 10/2016 | Tian | B05D 1/38 |
| 2017/0152666 | A1* | 6/2017 | Li | B32B 27/304 |
| 2019/0211571 | A1 | 7/2019 | Van Vlassenrode et al. | |

FOREIGN PATENT DOCUMENTS

| | | | |
|---|---|---|---|
| WO | 2016160666 | A1 | 10/2016 |
| WO | 2017064108 | A1 | 4/2017 |

OTHER PUBLICATIONS

"Silane Coupling Agents: Combination of Inorganic and Organic Materials", Shin-Etsu Chemical Co., Ltd., (2017); pp. 1-28.*
Belgian Search Report from corresponding BE Application No. 2021/5783, Jul. 11, 2022.
Belgian Search Report from corresponding BE Application No. 2022/5540, Jan. 4, 2023.
International Search Report from corresponding PCT Application No. PCT/IB2022/059447, Dec. 19, 2022.

* cited by examiner

DECORATIVE PANEL

BACKGROUND

The invention relates to decorative panels with high scratch resistance. Decorative panels find applications for example as wall panels, ceiling panels, in furniture and as floor panels. Floor panels in particular must be resistant to wear. Therefore it is known to provide decorative panels with a wear layer which increases the durability of these panels.

An objective of the invention is to make panels available that have a decorative layer with improved durability and with a good visual appearance.

The first aspect of the invention relates to a decorative panel, wherein the decorative panel comprises a substrate and a wear layer, wherein the wear layer comprises a varnish coat, characterized in that the varnish coat contains hard particles over the entire thickness, wherein the hard particles have an S50 particle size, wherein the S50 particle size, determined from the cumulative particle size distribution according to volume measured by laser diffraction, is the particle size at which 50% of the hard particles are smaller than this particle size S50; in that the varnish coat has a thickness T; and in that the thickness T of the varnish coat is between 0.5*S50 and 2*S50; and preferably between 0.7*S50 and 1.8*S50.

It has been found that decorative panels with good resistance to abrasion still do not have good resistance to scratches caused by sharp objects. For example, dogs' toenails may be the cause of scratches, even on floor panels that have excellent resistance to abrasion caused by walking on these floor panels. The decorative panel according to the invention has the advantage that improved durability is obtained, namely through good scratch resistance. This is obtained by adapting the particle size of the particles to the thickness of the varnish coat in which these particles are located. This ensures that hard particles of the varnish coat project slightly on the surface of the decorative panel, so that scratches are prevented; while the surface of the panel still produces a nice visual appearance.

SUMMARY

A preferred embodiment is characterized in that the varnish coat is an acrylate varnish coat or a polyurethane varnish coat.

A preferred embodiment is characterized in that the varnish coat is an acrylate varnish coat, wherein the acrylate varnish coat is obtained using at least 0.1 wt % of dendritic oligomer with an acrylate functionality of 5 or higher, wherein this percentage by weight is determined relative to the total weight of the varnish coat. Preferably the acrylate varnish coat is obtained using at least 1 wt % of dendritic oligomer with an acrylate functionality of 5 or higher. More preferably the acrylate varnish coat is obtained using at least 5 wt % of dendritic oligomer with an acrylate functionality of 5 or higher. More preferably the acrylate varnish coat is obtained using at least 10 wt % of dendritic oligomer with an acrylate functionality of 5 or higher. More preferably the acrylate varnish coat is obtained using at least 12 wt % of dendritic oligomer with an acrylate functionality of 5 or higher. Use of dendritic oligomer as described in these preferred embodiments has the advantage that a higher crosslink density of the varnish coat is obtained; this provides a very strong and rigid polymer network of the varnish coat. As a result, a decorative panel with even better scratch resistance and durability is obtained synergistically.

A preferred embodiment is characterized in that the S50 particle size is between 3 micrometers and 20 micrometers, more preferably between 5 micrometers and 15 micrometers. These embodiments ensure even better durability of the decorative panel.

A preferred embodiment is characterized in that the hard particles have a particle size distribution according to volume wherein (S95−S5)/S50 is less than 2, and preferably less than 1.5, and more preferably less than 1.4; wherein S95 in the particle size distribution according to volume as determined by laser diffraction is the particle size at which 95% of the particles are smaller; and wherein S5 in the particle size distribution according to volume as determined by laser diffraction is the particle size at which 5% of the particles are smaller.

A preferred embodiment is characterized in that the hard particles have a particle size distribution according to volume wherein (S95−S50)/S50 is less than 1, and preferably less than 0.9; wherein S95 in the particle size distribution according to volume as determined by laser diffraction is the particle size at which 95% of the particles are smaller.

A preferred embodiment is characterized in that the hard particles have a particle size distribution according to volume wherein (S50−S5)/S50 is less than 0.8, and preferably less than 0.6; wherein S5 in the particle size distribution according to volume as determined by laser diffraction is the particle size at which 5% of the particles are smaller.

These three embodiments ensure synergistically even better properties of the decorative panel, because the small-particle fraction and the large-particle fraction are greatly restricted. A high large-particle fraction has the drawback that it causes considerable wear of tooling that comes into contact with the surface of the panel during production, for example press plates with which a relief is pressed into the surface of the decorative panel. Wear like this soon means that the visual appearance of the panel is no longer optimal. The large-particle fraction is not embedded well in the varnish coat; these particles are driven out of the varnish coat on impact; this causes a defect in the varnish coat.

However, small particles have the drawback that they do not contribute to an improvement of scratch resistance, but do make the varnish coat less transparent, so that visual appearance is poorer. Therefore it is advantageous for the small-particle fraction in the particle size distribution to be limited.

A preferred embodiment is characterized in that the thickness T of the varnish coat is between 4 micrometers and 60 micrometers, and more preferably is less than 40 micrometers, and more preferably is less than 30 micrometers, and more preferably is less than 20 micrometers.

Thin varnish coats have the advantage that during application of the liquid varnish the hard particles can settle less, or not at all, so that the scratch resistance is better. Thin varnish coats also have the advantage that they are more transparent.

A preferred embodiment is characterized in that the varnish coat comprises between 2 and 15 wt % of hard particles; and more preferably between 3 and 10 wt % and/or more preferably more than 5 wt %; more preferably more than 7 wt %.

These embodiments give good results with respect to durability of the panel, without the other properties of the decorative surface, for example the visual appearance, being negatively impacted.

A preferred embodiment is characterized in that the hard particles are spherical particles or nonspherical particles or plate shaped particles, for example plate shaped with a hexagonal shape.

The use of hard particles that are nonspherical and/or are plate shaped has the advantage that these particles can be directed with their longest dimension parallel to the surface of the panel. This provides even better scratch resistance without the visual appearance being greatly affected by particles that project above the surface of the varnish. Another advantage is that less wear of tooling occurs during production of the decorative panel.

A preferred embodiment is characterized in that the hard particles have an average aspect ratio between 2:1 and 7:1.

These embodiments have the advantage that even better scratch resistance of the surface of the decorative panel is obtained. It is suspected that this is due to the fact that the hard particles are aligned preferentially with their largest dimension parallel to the surface of the panel. This also ensures that the visual appearance of the surface of the panel is excellent.

A preferred embodiment is characterized in that the hard particles have a Mohs hardness higher than 7, and preferably higher than 8; and more preferably of at least 9.

A preferred embodiment is characterized in that the hard particles are aluminum oxide particles or diamond particles or silicon carbide particles or moissanite particles.

A preferred embodiment is characterized in that the hard particles comprise a silane coating, for example wherein the hard particles are silane-coated aluminum oxide particles.

Said embodiment offers the advantage that the hard particles art better embedded in the varnish coat.

A preferred embodiment is characterized in that the varnish coat does not comprise a layer of paper.

A preferred embodiment is characterized in that the varnish coat is cured at least partly by means of UV radiation and/or by means of excimer radiation and/or by means of an electron beam and/or by means of increased temperature.

The use of excimer radiation for at least partly curing the varnish coat has the advantage that a super-mat surface of the decorative panel can be obtained, with or without minimal use of matting agents in the varnish coat. Since the varnish coat comprises little or no matting agents (e.g. silica), this varnish coat offers even better durability, since matting agents are adverse for the durability of this varnish coat.

A preferred embodiment is characterized in that there is a second varnish coat underneath the varnish coat. More preferably, this second varnish coat is an acrylate varnish coat or a polyurethane varnish coat. Preferably this second varnish coat is in contact with the varnish coat.

A preferred embodiment is characterized in that the second varnish coat is an acrylate varnish coat, wherein this acrylate varnish coat is obtained using at least 0.1 wt % of dendritic oligomer with an acrylate functionality of 5 or higher, wherein this percentage by weight is determined relative to the total weight of the varnish coat. Preferably this acrylate varnish coat is obtained using at least 1 wt % of dendritic oligomer with an acrylate functionality of 5 or higher. More preferably this acrylate varnish coat is obtained using at least 5 wt % of dendritic oligomer with an acrylate functionality of 5 or higher. More preferably this acrylate varnish coat is obtained using at least 10 wt % of dendritic oligomer with an acrylate functionality of 5 or higher. More preferably this acrylate varnish coat is obtained using at least 12 wt % of dendritic oligomer with an acrylate functionality of 5 or higher. Use of dendritic oligomer as described in these preferred embodiments has the advantage that a higher crosslink density of the varnish coat is obtained; this provides a very strong and rigid polymer network of the varnish coat. As a result, a decorative panel with even better scratch resistance and durability is obtained synergistically.

One advantage is that this second varnish coat can function as a priming coat, and thus increases the durability of the decorative panel.

In a preferred embodiment the second varnish coat does not comprise any particles with Mohs hardness higher than 7.

These embodiments have the advantage that even better durability of the decorative panel is obtained, because the second varnish coat functions as a primer for the varnish coat. The second varnish coat may optionally comprise matting agents. However, it is also possible that the second varnish coat does not comprise any matting agents.

In a preferred embodiment of the invention the thickness of the second varnish coat is between half and twice the thickness of the varnish coat. Said embodiments may for example be applied when the decorative panel comprises a substrate that comprises one or more polyvinyl chloride layers. One or more of these polyvinyl chloride layers may comprise fillers (for example mineral fillers or wood-based fillers) and/or may be foamed.

A preferred embodiment is characterized in that the second varnish coat comprises hard particles with Mohs hardness higher than 7. Preferably the hard particles in the second varnish coat have an average size (meaning the S50 particle size) of more than 50 micrometers, more preferably of more than 75 micrometers; and more preferably of less than 125 micrometers and more preferably of less than 100 micrometers.

These embodiments have the advantage that the abrasion resistance is further increased. While the varnish coat mainly provides high scratch resistance, this second varnish coat provides abrasion resistance. The abrasion resistance can be determined by the Taber test, according to ASTM D4060-19.

In preferred embodiments in which the second varnish coat comprises hard particles, the second varnish coat is preferably at least 125 micrometers thick, more preferably at least 150 micrometers thick, and more preferably at least 175 micrometers thick.

A preferred embodiment is characterized in that the wear layer comprises, under the second varnish coat, a third varnish coat-preferably an acrylate varnish coat or a polyurethane varnish coat, and optionally comprises a fourth varnish coat-preferably an acrylate varnish coat or a polyurethane varnish coat; and optionally comprises a fifth varnish coat-preferably an acrylate varnish coat or a polyurethane varnish coat.

These embodiments offer even better durability, since the abrasion resistance of the decorative panel is higher.

More preferably, the third varnish coat, the optional fourth varnish coat and the optional fifth varnish coat does/do not comprise any particles with Mohs hardness higher than 7.

A preferred embodiment is characterized in that the optional third varnish coat—and optionally the optional fourth varnish coat, and optionally the optional fifth varnish coat—is an acrylate varnish coat, wherein this acrylate varnish coat is obtained using at least 0.1 wt % of dendritic oligomer with an acrylate functionality of 5 or higher, wherein this percentage by weight is determined relative to the total weight of the varnish coat. Preferably this acrylate varnish coat is obtained using at least 1 wt % of dendritic oligomer with an acrylate functionality of 5 or higher. More preferably this acrylate varnish coat is obtained using at least 5 wt % of dendritic oligomer with an acrylate functionality of 5 or high. More preferably this acrylate varnish coat is obtained using at least 10 wt % of dendritic oligomer with an acrylate functionality of 5 or higher. More preferably this acrylate varnish coat is obtained using at least 12 wt % of dendritic oligomer with an acrylate functionality of 5 or higher. Use of dendritic oligomer as described in these preferred embodiments has the advantage that a higher crosslink density of the varnish coat is obtained; this provides a very strong and rigid polymer network of the varnish coat. As a result, a decorative panel with even better scratch resistance and durability is obtained synergistically.

This ensures good adhesion of the varnish coats, which is favorable for the abrasion resistance.

A preferred embodiment is characterized in that the varnish coat comprises, and more preferably consists of, a first partial varnish coat with thickness T1 and a second partial varnish coat with thickness T2, wherein the second partial varnish coat is applied on the first partial varnish coat, wherein both the thickness T1 of the first partial varnish coat and the thickness T2 of the second varnish coat is between 0.5*S50 and 2*S50; and preferably between 0.7*S50 and 1.8*S50.

The presence of the first partial varnish coat and of the second partial varnish coat and their respective thicknesses can be determined by means of a cross section of the decorative panel. It requires experience to prepare a good cross section, but a trained laboratory technician will be able to do so.

These embodiments have the advantage that even better durability of the decorative panel is obtained, especially if the total thickness of the varnish coat is limited, for example 30 micrometers or even less. The inventors suspect that this is connected with unavoidable irregularities in application of a varnish coat. These irregularities are eliminated on applying the varnish coat via a first partial varnish coat and a second partial varnish coat. For example, in order to apply a varnish coat with a thickness of 30 micrometers, the varnish coat can be applied via two partial varnish coats each with a thickness of 15 micrometers. For example, in order to apply a varnish coat with a thickness of 15 micrometers, the varnish coat can be applied via two partial varnish coats each with a thickness of 7.5 micrometers.

The better performance is probably also obtained because the particle size of the hard particles is coordinated optimally with the thicknesses of the first partial varnish coat and of the second partial varnish coat in the varnish coat.

The inventors have also noticed that especially when applying the varnish coat on a carrier that is already provided with a surface texture, better results with respect to scratch resistance are obtained when the varnish coat is applied via two partial varnish coats.

A preferred embodiment is characterized in that the panel comprises a decorative layer, wherein the decorative layer is located underneath the wear layer; preferably the decorative layer is located above the substrate, or the decorative layer is formed by the upper surface of the substrate.

Preferably the decorative layer comprises a print, more preferably a print on the substrate or a print on a carrier. This carrier may for example be or comprise a paper sheet or a polymer film. An example of a polymer film that can be used as a carrier is a polyvinyl chloride film.

A preferred embodiment is characterized in that the wear layer comprises an additional layer, situated closer to the substrate than the varnish coat, wherein the additional layer comprises a polymer film, preferably a polyvinyl chloride film. More preferably this polymer film (for example a polyvinyl chloride film) has a thickness between 20 micrometers and 800 micrometers, more preferably a thickness between 20 micrometers and 500 micrometers, more preferably a thickness less than 550 micrometers, more preferably a thickness less than 250 micrometers.

Said additional layer in the wear layer, closer to the substrate than the varnish coat, has the advantage that better abrasion resistance of the panel is obtained.

Preferably the polymer film is a polymer film with a hardness of at least 60 Shore D, and more preferably at least 70 Shore D, and more preferably at least 75 Shore D. It was found, surprisingly, that these embodiments produced a decorative panel with even better scratch resistance. This means that decorative panels with even better durability were obtained.

Preferably, the polymer film is a polyvinyl chloride film that comprises less than 20 wt % of plasticizer, and more preferably comprises less than 15 wt % of plasticizer; and preferably comprises less than 10 wt % of plasticizer; and more preferably comprises more than 3 wt % of plasticizer. It was found, surprisingly, that these embodiments produced a decorative panel with even better scratch resistance. This means that decorative panels with even better durability were obtained.

In the context of the various aspects of the invention, in a polyvinyl chloride film, use may be made of various plasticizers. The plasticizers may be selected from terephthalates for example such as dioctyl terephthalate (DOTP) or dibutyl terephthalate (DBT), orthophthalates for example such as diisononyl phthalate (DINP) or di(2-propylheptyl) phthalate (DPHP), (cyclo) hexanoates for example such as 1,2-cyclohexane dicarboxylic acid diisononyl ester (DINCH), adipates for example such as dioctyl adipate (DOA), benzoates for example such as isodecyl benzoate (IDB), plasticizers based on vegetable oils for example such as ESBO, sulfonates, citrates, benzoate esters, sebacates, and polyesters.

Preferably the wear layer comprises an additional layer, wherein the additional layer comprises a paper sheet impregnated with a resin-preferably with a melamine resin or with an acrylate resin or with a polyurethane resin, preferably wherein this resin comprises particles in order to increase the wear resistance of the wear layer.

This additional layer has the advantage that the abrasion resistance of the panel is higher.

Preferably the surface of the panel comprises a texture, wherein the texture reaches at least into the additional layer.

A preferred embodiment is characterized in that the decor of the decorative panel is formed by the surface of a layer of veneer or by means of a layer of wood. When using a layer of wood for forming the decor, this layer of wood is for example 3 millimeters thick.

A preferred embodiment is characterized in that the substrate consists of or comprises one or more of

- a wood fiber board, preferably an MDF board (Medium Density Fiberboard) or an HDF board (High Density Fiberboard);
- a chipboard;
- one or more layers of filled or unfilled polymer, preferably thermoplastic polymer, preferably polyvinyl chloride;
- one or more layers that comprise a mineral matrix with fillers; for example a mineral matrix based on Portland cement or on magnesium oxide or on gypsum;
- one or more layers of wood; or
- one or more resin-impregnated layers of kraft paper, preferably phenol formaldehyde resin-impregnated layers of kraft paper.

A preferred embodiment is characterized in that the surface of the panel comprises a texture. This signifies that the varnish coat is not flat and also comprises surface texture.

A preferred embodiment is characterized in that the distance perpendicular to the panel between the highest and the lowest point in the texture is more than 200 micrometers, and preferably more than 400 micrometers.

A preferred embodiment is characterized in that the distance perpendicular to the panel between the highest and the lowest point in the texture is more than 15 micrometers and preferably less than 30 micrometers.

A preferred embodiment is characterized in that the panel comprises a first pair of opposite edges, namely a first edge and a second edge, wherein the first pair of opposite edges comprises coupling parts, wherein these coupling parts comprise locking parts, so that the panel can be coupled with its first edge to the second edge of another such panel so that on the one hand locking is obtained in the direction perpendicular to the plane of the panels thus coupled, and on the other hand locking is obtained in the direction in the plane of the coupled panels perpendicular to the coupled panels.

A preferred embodiment is characterized in that the panel comprises a second pair of opposite edges, namely a third edge and a fourth edge, wherein the second pair of opposite edges comprises coupling parts, wherein these coupling parts comprise locking parts, so that the panel can be coupled with its third edge to the fourth edge of another such panel so that on the one hand locking is obtained in the direction perpendicular to the plane of the panels thus coupled, and on the other hand locking is obtained in the direction in the plane of the coupled panels perpendicular to the coupled panels.

The decorative panel according to the first aspect of the invention is preferably a floor panel.

The second aspect of the invention relates to a method for producing a cured varnish coat on a carrier, wherein a liquid varnish is applied on the carrier to form, with this liquid varnish, a cured varnish coat of thickness T, wherein the varnish can be cured by means of UV radiation and/or by thermal curing; characterized in that the liquid varnish comprises hard particles with an S50 particle size, wherein the S50 particle size is determined from the cumulative particle size distribution according to volume measured by laser diffraction as the particle size at which 50% of the hard particles are smaller than this particle size S50; and in that the thickness T of the cured varnish coat to be formed is between 0.5*S50 and 2*S50; and wherein the cured varnish coat comprises the hard particles over its entire thickness T.

It was found that wear layers on decorative panels with good resistance to abrasion still do not have good resistance to scratches caused by sharp objects. For example, dogs' toenails may cause scratches, even on floor panels that have excellent resistance to abrasion caused by walking on these floor panels. The method according to the second aspect of the invention has the advantage that improved durability is obtained, namely through good scratch resistance. This is obtained by coordinating the particle size of the particles with the thickness of the varnish coat in which these particles are located. This ensures that hard particles project slightly from the varnish coat on the surface, so that scratches are prevented; while the surface of the panel still produces a nice visual appearance.

A preferred embodiment of the second aspect of the invention is characterized in that the thickness T of the cured varnish coat to be formed is between 0.7*S50 and 1.8*S50.

This embodiment gives even better results with respect to durability.

A preferred embodiment of the invention is characterized in that the varnish coat is an acrylate varnish coat or a polyurethane varnish coat.

A preferred embodiment of the invention is characterized in that the liquid varnish is selected from a 100% acrylate varnish, a water-based UV-acrylate and a water-based polyurethane dispersion.

Preferably, the liquid varnish is a 100% acrylate varnish, wherein the liquid varnish comprises at least 0.1 wt % of dendritic oligomer with an acrylate functionality of 5 or higher. More preferably the liquid varnish comprises at least 1 wt % of dendritic oligomer with an acrylate functionality of 5 or higher. More preferably the liquid varnish comprises at least 5 wt % of dendritic oligomer with an acrylate functionality of 5 or higher. More preferably the liquid varnish comprises at least 10 wt % of dendritic oligomer with an acrylate functionality of 5 or higher. More preferably the liquid varnish comprises at least 12 wt % of dendritic oligomer with an acrylate functionality of 5 or higher. Use of dendritic oligomer as described in these preferred embodiments has the advantage that a higher crosslink density of the varnish coat is obtained; this provides a very strong and rigid polymer network of the varnish coat. As a result, a decorative panel with even better scratch resistance and durability is obtained synergistically.

A preferred embodiment of the invention is characterized in that the S50 particle size is between 3 micrometers and 20 micrometers, preferably between 5 micrometers and 15 micrometers.

These embodiments ensure even better durability of the decorative panel.

A preferred embodiment of the invention is characterized in that the hard particles have a particle size distribution according to volume wherein (S95-S5)/S50 is less than 2, and preferably less than 1.5, and more preferably less than 1.4; wherein S95 in the particle size distribution according to volume as determined by laser diffraction is the particle size at which 95% of the particles are smaller; and wherein S5 in the particle size distribution according to volume as determined by laser diffraction is the particle size at which 5% of the particles are smaller.

A preferred embodiment of the invention is characterized in that the hard particles have a particle size distribution according to volume wherein (S95-S50)/S50 is less than 1, and preferably less than 0.9; wherein S95 in the particle size distribution according to volume as determined by laser diffraction is the particle size at which 95% of the particles are smaller.

A preferred embodiment of the invention is characterized in that the hard particles have a particle size distribution according to volume wherein (S50-S5)/S50 is less than 0.8, and preferably less than 0.6; wherein S5 in the particle size distribution according to volume as determined by laser diffraction is the particle size at which 5% of the particles are smaller.

These three embodiments ensure synergistically even better properties, because the small-particle fraction and the large-particle fraction are greatly restricted. A high large-particle fraction has the drawback that it causes considerable wear of tooling that comes into contact with the surface of this varnish coat during production, for example press plates with which a relief is pressed into the surface. Wear like this soon means that the visual appearance of the panel is no longer optimal. The large-particle fraction is not embedded well in the varnish coat; these particles are driven out of the varnish coat on impact; this causes a defect in the varnish coat.

Small particles also have the drawback that they do not contribute to improvement of the scratch resistance, but do make the varnish coat less transparent, so that the visual appearance is poorer. Therefore it is advantageous for the small-particle fraction in the particle size distribution to be restricted.

A preferred embodiment of the invention is characterized in that the thickness T of the varnish coat to be formed is between 4 micrometers and 60 micrometers, and is preferably less than 40 micrometers; and more preferably is less than 30 micrometers, and more preferably is less than 20 micrometers.

A preferred embodiment of the invention is characterized in that the varnish coat comprises between 2 and 15 wt % of hard particles; and preferably between 3 and 10 wt %; and/or preferably more than 5 wt % and more preferably more than 7 wt %.

A preferred embodiment of the invention is characterized in that the hard particles are spherical particles or nonspherical particles or plate shaped particles, for example plate shaped with a hexagonal shape.

A preferred embodiment of the invention is characterized in that the hard particles have an average aspect ratio between 2:1 and 7:1.

A preferred embodiment of the invention is characterized in that the hard particles have a Mohs hardness higher than 7, and more preferably higher than 8; and more preferably have a Mohs hardness of at least 9.

A preferred embodiment of the invention is characterized in that the hard particles are aluminum oxide particles or diamond particles or silicon carbide particles or moissanite particles.

A preferred embodiment of the invention is characterized in that the hard particles comprise a silane coating, for example wherein the hard particles are silane-coated aluminum oxide particles.

This embodiment ensures that the hard particles are embedded well in the varnish coat.

A preferred embodiment of the invention is characterized in that application of the liquid varnish for forming, with this varnish, the cured varnish coat of thickness T is carried out in steps, wherein in a first step, a first layer of liquid varnish is applied, wherein the method comprises the step of applying a second layer of liquid varnish; wherein the first layer of liquid varnish and the second layer of liquid varnish together form the liquid varnish for forming the cured varnish coat of thickness T.

These embodiments have the advantage that even better durability of the decorative panel is obtained, especially if the total thickness of the varnish coat is limited, for example 30 micrometers or even less. The inventors suspect that this is connected with unavoidable irregularities in application of a varnish coat. These irregularities are eliminated by applying this varnish coat twice. For example, in order to apply a varnish coat with a cured thickness of 30 micrometers, the varnish coat can be applied in two layers each with a cured thickness of 15 micrometers. For example, in order to apply a varnish coat with a cured thickness of 15 micrometers, the varnish coat may be applied in two layers each with a cured thickness of 7.5 micrometers.

The inventors have also noticed that especially when applying the varnish coat on a carrier that is already provided with a surface texture, better results with respect to scratch resistance are obtained when the varnish coat is applied by means of a first layer of liquid varnish and a second layer of liquid varnish.

The first layer of liquid varnish may be dried and/or partially cured before applying the second layer of liquid varnish.

It is possible for the first layer of liquid varnish not to be dried and/or not to be partially cured before applying the second layer of liquid varnish. This embodiment may for example be carried out if the first layer of liquid varnish and the second layer of liquid varnish have the same composition.

Preferably, after application of the first layer of liquid varnish, a brushing treatment is carried out in the wet varnish coat formed during application of the first layer of liquid varnish. This has the advantage that the varnish is distributed well and uniformly before applying the second layer of liquid varnish. This ensures, synergistically, even better scratch resistance and better durability of the decorative panel.

A preferred embodiment of the invention is characterized in that the first layer of liquid varnish and the second layer of liquid varnish have the same composition, wherein the first layer of liquid varnish results, after curing, in a layer of thickness T1 and wherein the second layer of liquid varnish results, after curing, in a layer of thickness T2, wherein the liquid varnish of the first layer and the liquid varnish of the second layer comprise the hard particles; wherein the layer thicknesses T1 and T2 are each between 0.5*S50 and 2*S50.

These embodiments offer even better performance, because the particle size of the hard particles are coordinated optimally with the cured layer thicknesses of the two layers in the varnish coat.

A preferred embodiment of the invention is characterized in that the first layer of liquid varnish and the second layer of liquid varnish have a different composition; wherein the first layer of liquid varnish results, after curing, in a layer of thickness T1 and wherein the second layer of liquid varnish results, after curing, in a layer of thickness T2. The first layer of liquid varnish comprises hard particles over the entire thickness, wherein the hard particles of the first layer of liquid varnish have an S50-1 particle size, wherein the S50-1 particle size, determined from the cumulative particle size distribution according to volume measured by laser diffraction, is the particle size at which 50% of the hard particles of the first layer of liquid varnish are smaller than this particle size S50-1; wherein the layer thickness T1 is between 0.5*S50-1 and 2*S50-1; and preferably is between 0.7*S50-1 and 1.8*S50-1. The second layer of liquid varnish comprises hard particles over the entire thickness, wherein the hard particles of the second layer of liquid varnish have an S50-2 particle size, wherein the S50-2 particle size, determined from the cumulative particle size distribution according to volume measured by laser diffraction, is the particle size at which 50% of the hard particles of the second liquid layer are smaller than this particle size S50-2; wherein the layer thickness T2 is between 0.5*S50-2 and 2*S50-2; and preferably is between 0.7*S50-2 and 1.8*S50-2.

This embodiment offers excellent results with respect to durability, also because the particle size of the two layers can be selected separately in order to obtain optimal properties. The layer thickness T1 after curing of the first layer of liquid varnish may for example be selected to be greater than the layer thickness T2 after curing of the second layer of liquid varnish, wherein the first layer of liquid varnish comprises larger hard particles than the second layer of liquid varnish. As a result, it is possible to obtain an optimal combination of scratch resistance (especially provided by the second layer of liquid layer that forms the top layer) and abrasion resistance (influenced strongly positively by the underlying first layer of liquid varnish).

A preferred embodiment of the invention is characterized in that the layer thickness T1 after curing of the first layer of liquid varnish is less than 25 micrometers (and preferably less than 20 micrometers); and/or in that the layer thickness T2 after curing of the second layer of liquid varnish is less than 25 micrometers (and preferably less than 20 micrometers).

A preferred embodiment of the second aspect of the invention is characterized in that the first layer of liquid varnish and/or the second layer of liquid varnish comprises at least 0.1 wt % of dendritic oligomer with an acrylate functionality of 5 or higher, preferably comprises at least 1 wt % of dendritic oligomer with an acrylate functionality of 5 or higher, more preferably comprises at least 5 wt % of dendritic oligomer with an acrylate functionality of 5 or higher, more preferably comprises at least 10 wt % of dendritic oligomer with an acrylate functionality of 5 or higher, more preferably comprises at least 12 wt % of dendritic oligomer with an acrylate functionality of 5 or higher. Use of dendritic oligomer as described in these preferred embodiments has the advantage that a higher crosslink density of the varnish coat is obtained; this provides a very strong and rigid polymer network of the varnish coat. As a result, a decorative panel with even better scratch resistance and durability is obtained synergistically.

A preferred embodiment of the invention is characterized in that the method comprises the step of curing the varnish coat at least partly by means of UV radiation and/or by means of excimer radiation and/or by means of an electron beam.

The use of excimer radiation in the method according to the invention for at least partly curing the varnish coat has the advantage that a super-mat surface of the varnish coat can be obtained, with or without minimal use of matting agents in the varnish coat. Since the varnish coat comprises little or no matting agents (e.g. silica), this varnish coat offers even better durability, since matting agents are adverse for the durability of this varnish coat.

A preferred embodiment of the invention is characterized in that, for applying the liquid varnish, the method comprises the step of applying a second varnish coat on the carrier by the liquid method—preferably an acrylate varnish coat or a polyurethane varnish coat—followed by drying and/or gelling and/or partial curing of this second varnish coat; preferably wherein the second varnish coat does not comprise any particles with Mohs hardness higher than 7.

One advantage is that this second varnish coat can function as a priming coat, and thus increases the durability of the decorative panel.

Embodiments in which the second varnish coat does not comprise particles with Mohs hardness higher than 7 offer the advantage that even better durability of the decorative panel is obtained, because the second varnish coat functions as a primer for the varnish coat. Optionally, the second varnish coat may comprise matting agents. However, it is also possible that the second varnish coat does not comprise any matting agents.

A preferred embodiment of the invention is characterized in that, for application of the second varnish coat on the carrier, the method comprises the step of applying, on the carrier, a third varnish coat-preferably an acrylate varnish coat or a polyurethane varnish coat, and optionally a fourth varnish coat-preferably an acrylate varnish coat or a polyurethane varnish coat; and optionally a fifth varnish coat-preferably an acrylate varnish coat or a polyurethane varnish coat, wherein application of each of these layers is followed by drying and/or gelling and/or partial curing of these varnish coats; preferably wherein the third varnish coat, the optional fourth varnish coat and the optional fifth varnish coat do not comprise any particles with Mohs hardness higher than 7.

These embodiments offer even better durability, since the abrasion resistance is higher.

A preferred embodiment of the invention is characterized in that the carrier comprises a decorative layer.

Preferably the decorative layer comprises a print, preferably a print on a carrier, for example on a paper sheet or on a polymer film—preferably on a polyvinyl chloride film, or on a substrate in sheet form.

The carrier may comprise a decor formed by the surface of a layer of veneer or by means of a layer of wood.

A preferred embodiment of the invention is characterized in that the carrier comprises a carrier layer, wherein the carrier layer comprises a polymer film-preferably a polyvinyl chloride film (preferably with a thickness between 20 micrometers and 800 micrometers, more preferably a thickness between 20 micrometers and 500 micrometers, and more preferably with a thickness of less than 550 micrometers, and more preferably with a thickness of less than 250 micrometers), or wherein the carrier layer comprises a paper sheet impregnated with a resin-preferably with a melamine resin or with an acrylate resin or with a polyurethane dispersion, preferably wherein this resin comprises particles in order to increase the wear resistance of the wear layer, wherein if the carrier comprises a decorative layer, the decorative layer is underneath the carrier layer.

Preferably the carrier layer comprises a polymer film-preferably a polyvinyl chloride film (preferably with a thickness between 20 micrometers and 500 micrometers, and more preferably with a thickness of less than 250 micrometers), wherein the polymer film is a polymer film with a hardness of at least 60 Shore D, and preferably at least 70 Shore D, and preferably at least 75 Shore D. It was found, surprisingly, that these embodiments produced a decorative panel with even better scratch resistance. This means that decorative panels with even better durability were obtained.

Preferably the carrier layer comprises a polymer film, wherein the polymer film is a polyvinyl chloride film—preferably with a thickness between 20 micrometers and 800 micrometers, more preferably with a thickness between 20 micrometers and 500 micrometers, and more preferably with a thickness of less than 550 micrometers, and more preferably with a thickness of less than 250 micrometers, wherein the polymer film is a polyvinyl chloride film that comprises less than 20 wt % of plasticizer, and preferably comprises less than 15 wt % of plasticizer; and preferably comprises less than 10 wt % of plasticizer; and more preferably comprises more than 3 wt % of plasticizer. It was found, surprisingly, that these embodiments produced a decorative panel with even better scratch resistance. This means that decorative panels with even better durability were obtained.

More preferably, the carrier comprises, under the carrier layer—and under the optional decorative layer-, a substrate, wherein the substrate consists of or comprises one or more of a wood fiber board, preferably an MDF or an HDF board;
- a chipboard;
- one or more layers of filled or unfilled polymer, preferably thermoplastic polymer, preferably polyvinyl chloride;
- one or more layers that comprise a mineral matrix with fillers; for example a mineral matrix based on Portland cement or on magnesium oxide or on gypsum;

one or more layers of wood; or one or more resin-impregnated layers of kraft paper, preferably with phenol formaldehyde resin-impregnated layers of kraft paper.

A preferred embodiment of the method according to the invention is characterized in that the surface of the carrier comprises a texture, wherein the varnish coat is formed in such a way that a texture is preserved in the varnish coat. This may for example be achieved by keeping the thickness of the varnish coat limited.

A preferred embodiment of the method according to the invention is characterized in that, after application of the varnish coat, a pressing operation with a surface with relief is carried out on the carrier provided with the varnish coat so that a texture is obtained on the surface of the carrier with the varnish coat, preferably wherein the varnish coat has undergone gelation, preferably by means of UV radiation, before the pressing operation.

In this way, a panel with surface texture, which has excellent durability, may be obtained efficiently.

A preferred embodiment of the method according to the invention is characterized in that the method comprises the step in which the carrier with the varnish coat thereon is laminated on a substrate so that a panel is formed, preferably wherein the substrate consists of or comprises one or more of a wood fiber board, preferably an MDF or an HDF board;

a chipboard;

one or more layers of filled or unfilled polymer, preferably thermoplastic polymer, preferably polyvinyl chloride;

one or more layers that comprise a mineral matrix with fillers; for example a mineral matrix based on Portland cement or on magnesium oxide or on gypsum;

one or more layers of wood; or one or more resin-impregnated layers of kraft paper, preferably with phenol formaldehyde resin-impregnated layers of kraft paper.

In this way, a panel with surface texture, which has excellent durability, may be obtained efficiently.

Preferably, this laminating is carried out by means of a pressing operation, preferably under the influence of heat.

Preferably, the pressing operation is carried out by means of a press surface with relief, so that a texture is formed in the surface of the panel.

Preferably, the pressing operation is followed by a step in which the varnish coat is cured further, preferably by means of UV radiation or by means of heat.

In this way, the varnish coat obtains its final properties with high durability.

A preferred embodiment is characterized in that the method relates to a method for producing a decorative panel such as in any embodiment of the first aspect of the invention.

BRIEF DESCRIPTION OF THE DRAWINGS

For better illustration of the features of the invention, some preferred embodiments are described hereunder, as examples without any limiting character, referring to the appended drawings, in which.

DETAILED DESCRIPTION OF VARIOUS EMBODIMENTS

Figure 1:
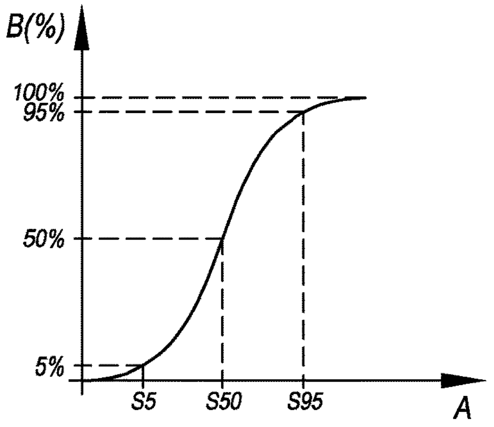
FIG. 1 illustrates the cumulative particle size distribution.
Figure 6:
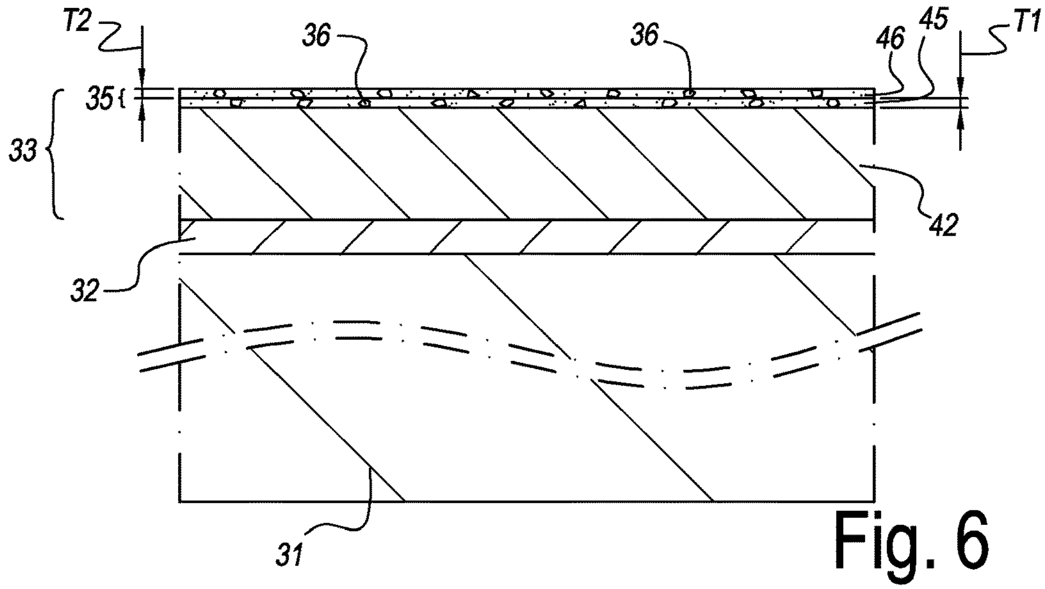

FIG. 1 illustrates the cumulative particle size distribution of hard particles such as applied in the invention. The particle size A (in micrometers) is plotted on the horizontal axis. The cumulative distribution according to volume of the particles, in percent, as determined by laser diffraction, is plotted on the vertical axis (B). The particle sizes S5, S50 and S95 are indicated in FIG. 6. S50 is the particle size at which 50% of the hard particles are smaller than this particle size S50. S95 is the particle size at which 95% of the particles are smaller than this particle size S95. S5 is the particle size at which 5% of the particles are smaller than this particle size S5.

An example of a recipe that may be used for a varnish coat, which may be cured by means of UV radiation, according to the invention is for example:

5-85 wt % of oligomer of an acrylate (for example a polyester acrylate, a polyether acrylate, an epoxy acrylate, a urethane acrylate or combinations of these types of acrylates), 5-60 wt % monomers, for example mono- or bifunctional acrylate monomers, 0.05-10 wt % photoinitiator and/or thermal initiator, 0.5-2 wt % antifoaming agent, 0.5-2 wt % wetting agent, 0.05-2 wt % leveling agent, 2-15 wt % of hard particles, optionally 0.05-10 wt % anti-slip agents, optionally 0.05-15 wt % matting agent, for example silica optionally 0.05-5 wt % UV or HALS absorbers.

A second example of a recipe that may be used for a varnish coat, which may be cured by means of UV radiation, according to the invention is for example:

5-85 wt % of oligomer of an acrylate (for example a polyester acrylate, a polyether acrylate, an epoxy acrylate, a urethane acrylate or combinations of these types of acrylates), 1-15 wt % of dendritic oligomer with an acrylate functionality of 5 or higher, 5-60 wt % monomers, for example mono- or bifunctional acrylate monomers, 0.05-10 wt % photoinitiator and/or thermal initiator, 0.5-2 wt % antifoaming agent, 0.5-2 wt % wetting agent, 0.05-2 wt % leveling agent, 2-15 wt % of hard particles, optionally 0.05-10 wt % anti-slip agents, optionally 0.05-15 wt % matting agent, for example silica optionally 0.05-5 wt % UV or HALS absorbers.

Examples of hard particles that are usable in these (or other) recipes for varnish coats according to the invention are:

Diamond particles, for example with S50 equal to 14 micrometers, S5 equal to 9 micrometers and S95 equal to 24 micrometers.

Diamond particles, for example with S50 equal to 6 micrometers, S5 equal to 3 micrometers and S95 equal to 11 micrometers.

Aluminum oxide particles, for example with S50 equal to 13.4 micrometers, S5 equal to 6.1 micrometers and S95 equal to 23.8 micrometers.

Aluminum oxide particles, for example with S50 equal to 7.7 micrometers, S5 equal to 2.7 micrometers and S95 equal to 14.9 micrometers.

Aluminum oxide particles, for example with S50 equal to 4.4 micrometers, S5 equal to 0.9 micrometers and S95 equal to 9.4 micrometers.

FIGS. 2-6 show the structure of examples of decorative panels according to the invention.

Figure 2:
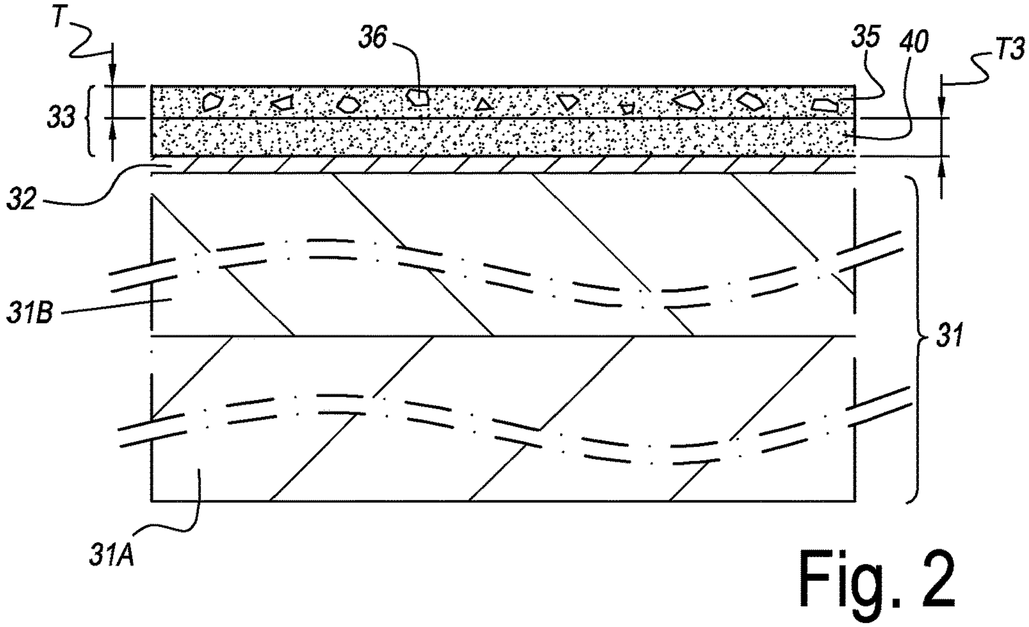
FIGS. 2-6 show the structure of examples of decorative panels according to the invention.

FIG. 2 shows the structure of a decorative panel according to the invention. The decorative panel comprises a substrate 31, a decorative layer 32, and a wear layer 33. The substrate may for example be a wood-based substrate, for example consisting of several layers 31A, 31B. The decorative layer may for example be a printed layer of paper, impregnated with a thermosetting resin, for example a melamine formaldehyde resin or an acrylate resin.

The wear layer 33 comprises a varnish coat 35 (of thickness T), which forms the surface of the panel, and a second varnish coat 40. In the example, both the varnish coat 35 and the second varnish coat 40 are acrylate varnish coats, applied as 100% acrylate varnishes (i.e. the varnish applied in liquid form comprises neither water nor some other solvents), which has first been gelled by means of UV radiation and further cured in a heated pressing operation. The varnish coat 35 is placed on and contacts the second varnish coat 40. The second varnish coat 40 does not comprise any particles with Mohs hardness higher than 7 and has a thickness T3; which is preferably between half and twice the thickness T of the varnish coat 35.

The varnish coat 35 comprises hard particles 36 over the entire thickness. The thickness T of the varnish coat is 20 micrometers. The varnish coat 35 comprises for example 8 wt % of hard particles 36. In this example the hard particles are diamond particles with S50 equal to 14 micrometers, S5 equal to 9 micrometers and S95 equal to 24 micrometers.

The surface of the panel comprises a surface structure, pressed therein by means of a press surface with texture. In this pressing operation, the decorative paper—with the varnish coats thereon in the gelled state—is laminated on the substrate, wherein the thermosetting resins are cured, including the varnish coat and the second varnish coat.

Optionally—not shown in FIG. 2—an adhesion layer may be applied on one or on both sides of the decorative layer, for example applied as a water-based polyurethane dispersion. This adhesion layer may be used in order to improve the adhesion between the respective layers in the decorative panel.

Figure 3:
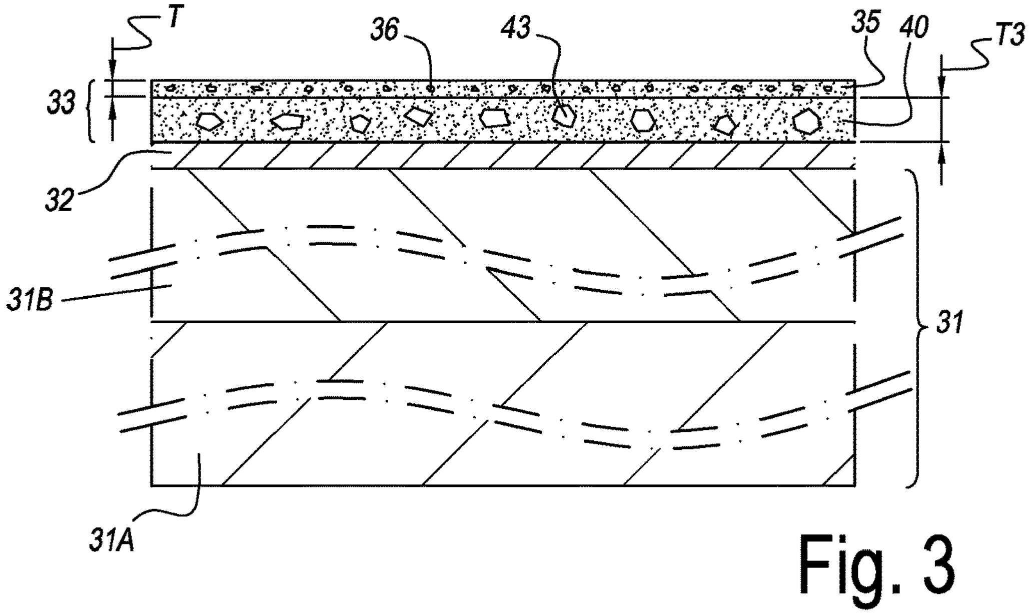

FIG. 3 shows the structure of a decorative panel according to the invention. The decorative panel comprises a substrate 31, a decorative layer 32, and a wear layer 33. The substrate may for example be a wood-based substrate, for example consisting of several layers 31A, 31B. The decorative layer may for example be a printed layer of paper, impregnated with a thermosetting resin, for example a melamine formaldehyde resin or an acrylate resin.

The wear layer 33 comprises a varnish coat 35 (of thickness T), which forms the surface of the panel, and a second varnish coat 40. In the example, both the varnish coat 35 and the second varnish coat 40 are acrylate varnish coats, applied as 100% acrylate varnishes (i.e. the varnish applied in liquid form comprises neither water nor some other solvent), which had first been gelled by means of UV radiation and was cured further in a heated pressing operation. The varnish coat 35 is placed on and contacts the second varnish coat 40.

The varnish coat 35 comprises hard particles 36 over the entire thickness. The thickness T of the varnish coat is 20 micrometers. The varnish coat 35 comprises for example 8 wt % of hard particles. In this example the hard particles are diamond particles with S50 equal to 14 micrometers, S5 equal to 9 micrometers and S95 equal to 24 micrometers.

The second varnish coat 40 comprises, over its entire thickness T3, hard particles 43, for example aluminum oxide particles, for example with average particle size (meaning the S50 particle size) of 90 micrometers. The thickness T3 of the second varnish coat 40 is preferably between 150 and 250 micrometers, more preferably between 180 and 200 micrometers.

The surface of the panel comprises a surface structure, pressed therein by means of a press surface with texture. In this pressing operation, the decorative paper—with the varnish coats thereon in the gelled state—was laminated on the substrate, wherein the thermosetting resins are cured, including the varnish coat and the second varnish coat.

Optionally—not shown in FIG. 3—an adhesion layer may be applied on one or on both sides of the decorative layer, for example applied as a water-based polyurethane dispersion. This adhesion layer may be used in order to improve the adhesion between the respective layers in the decorative panel.

Figure 4:
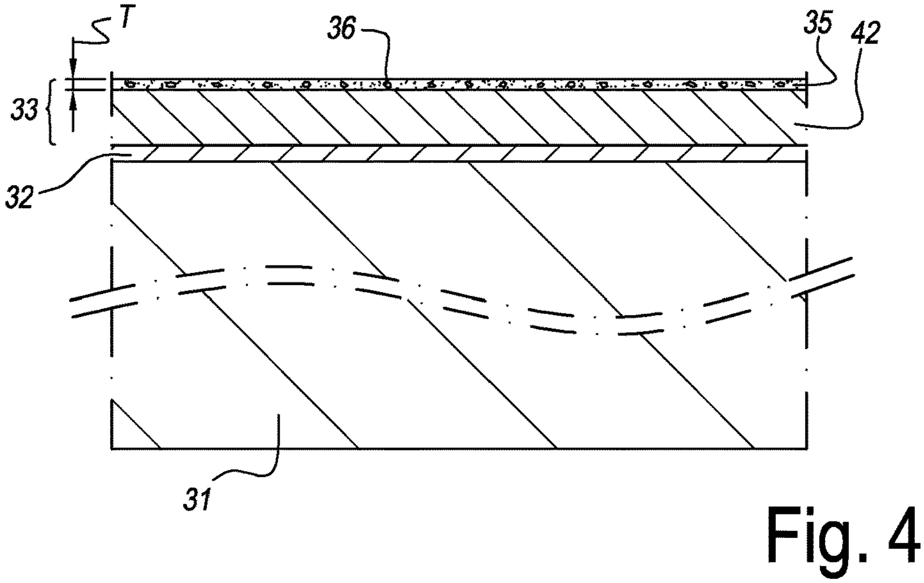

FIG. 4 shows another example of a floor panel according to the invention. This decorative floor panel comprises a substrate 31, a decorative layer 32, and a wear layer 33. The substrate 31 may for example consist of one or more polyvinyl chloride layers, with fillers. One or more of these layers may be foamed. One or more of these layers may be rigid or flexible polyvinyl chloride layers, depending on the amount of plasticizers that they contain.

The decorative layer 32 may be a printed polymer film, for example a printed polyvinyl chloride film with a thickness of 90 micrometers.

The wear layer 33 comprises a polymer film 42, for example a polyvinyl chloride film with a thickness between 20 micrometers and 500 micrometers. For example with a thickness of 300 micrometers.

The wear layer 33 further comprises a varnish coat 35 (of thickness T), which forms the surface of the panel. In the example in FIG. 4, the varnish coat 35 was applied as 100% acrylate varnish (i.e. the varnish applied in liquid form comprises neither water nor some other solvent). In the example the varnish coat 35 was applied after the thermal laminating of the substrate 31, the printed polymer film that forms the decorative layer 32 and the polymer film 42; and after the texturing of this laminate by means of a textured heated roller. The varnish coat 35 is applied so that a texture is preserved in the surface of the panel. After liquid application of the varnish coat 35 it is cured by means of UV radiation.

Alternatively, it is also possible not to press a texture in the surface after lamination of the various layers, apply the varnish coat as a liquid and gel it by means of UV radiation; and then press a texture in the surface of the panel by means of a heated textured roll. As a result of this thermal treatment—and optionally a thermal post-treatment—the varnish coat is then fully cured.

The varnish coat 35 comprises hard particles 36 over the entire thickness T. The thickness T of the varnish coat is 15 micrometers. The varnish coat 35 comprises for example 10 wt % of hard particles. In this example the hard particles are aluminum oxide particles with S50 equal to 13.4 micrometers, S5 equal to 6.1 micrometers and S95 equal to 23.9 micrometers. Other thicknesses and another selection of particles are possible within the scope of the invention.

Figure 5:
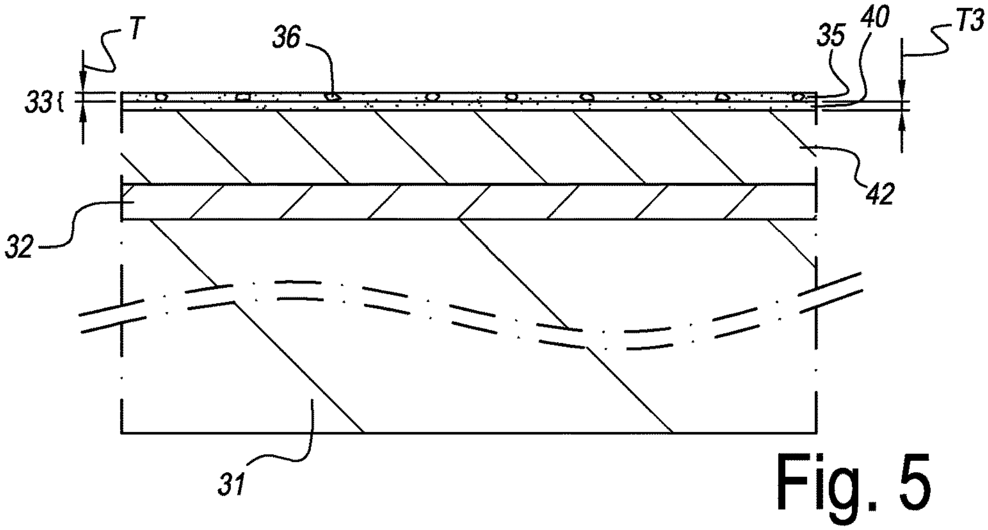

FIG. 5 shows another example of a floor panel according to the invention. This example is broadly similar to the example shown in FIG. 4. Identical reference numbers thus have the same meaning.

The panel in FIG. 5 differs from the panel in FIG. 4 by a difference in the varnish coat 35 and the presence of a second varnish coat 40. In this example the varnish coat 35 has a thickness T of 10 micrometers. This varnish coat comprises hard particles 36 over its entire thickness T. The varnish coat 35 comprises for example 10 wt % of hard particles. In this example the hard particles are aluminum oxide particles with S50 equal to 7.7 micrometers, S5 equal to 2.7 micrometers and S95 equal to 15 micrometers.

The varnish coat 35 is applied on a second varnish coat 40, which has a thickness of 10 micrometers and does not comprise any particles with Mohs hardness greater than 7.

In the example, the varnish coat 35 and the second varnish coat 40 are acrylate varnish coats. The second varnish coat 40 functions as an adhesion layer for the varnish coat 35.

The varnish coat 35 may be applied and cured in the same way as described in the example shown in FIG. 4.

FIG. 6 illustrates another example of a floor panel according to the invention. This example is broadly similar to the example shown in FIG. 4. Identical reference numbers thus have the same meaning.

The panel in FIG. 6 differs from the panel in FIG. 4 by a difference in the structure of the wear layer 33. The wear layer 33 comprises a polymer film 42, for example a polyvinyl chloride film with a thickness between 20 micrometers and 500 micrometers. For example with a thickness of 300 micrometers. The wear layer 33 further comprises a varnish coat 35. The varnish coat 35 is built up from a first partial varnish coat 45 with thickness T1 and a second partial varnish coat 46 with thickness T2. The second partial varnish coat 46 is applied on the first partial varnish coat 45. In the example a first partial varnish coat 45 has a thickness T1 equal to 10 micrometers; and the second partial varnish coat 46 has a thickness T2 equal to 10 micrometers.

The first partial varnish coat 45 and the second partial varnish coat 46 have the same composition and are acrylate varnish coats, applied as liquid varnish. Both the first partial varnish coat 45 and the second partial varnish coat 46 comprise 10 wt % of hard particles 36. In this example the hard particles are aluminum oxide particles with S50 equal to 7.7 micrometers, S5 equal to 2.7 micrometers and S95 equal to 15 micrometers.

After applying the first partial varnish coat 45, the second partial varnish coat 46 may be applied. The panel may be provided with a surface texture in the same way as described in FIG. 4.

In the example in FIG. 6, the first partial varnish coat and the second partial varnish coat have the same composition. This need not necessarily be so for the invention.

Figure 7:
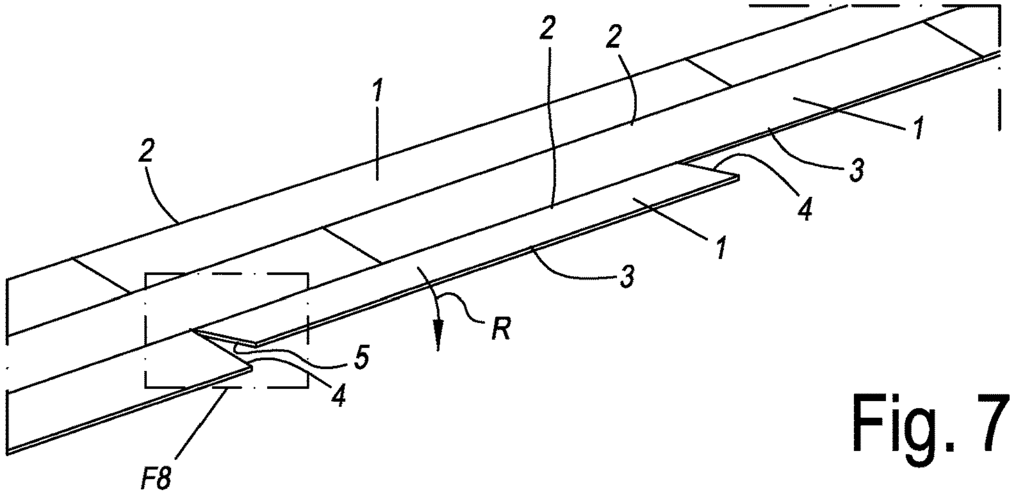
FIG. 7 shows, schematically and in perspective, a portion of a floor covering that consists of floor panels according to the invention.
Figure 8:
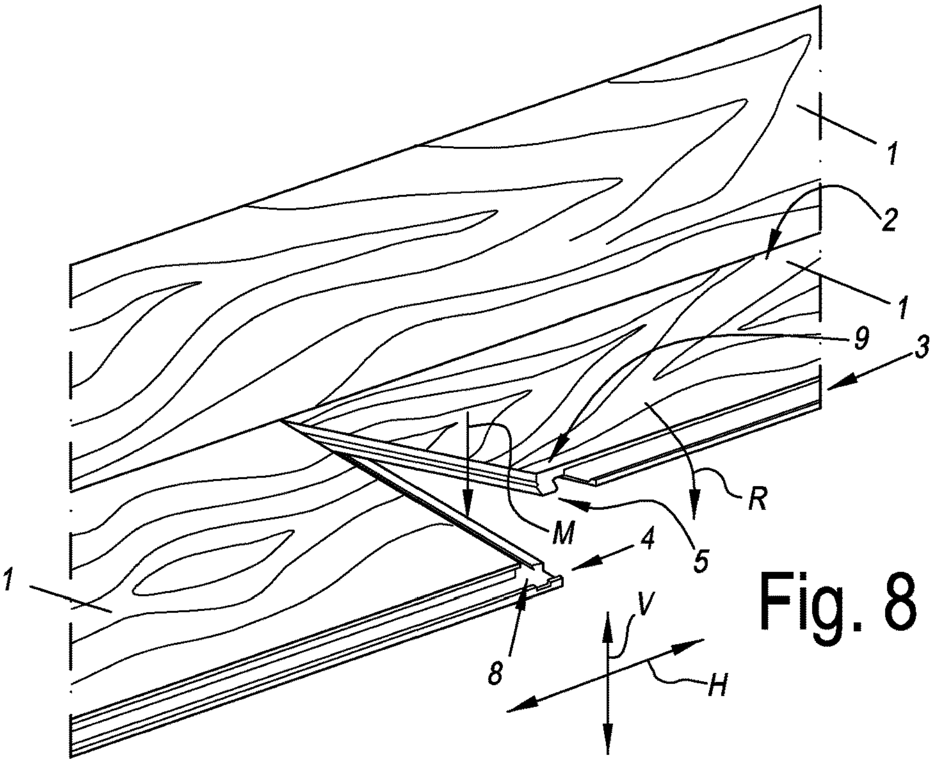
FIG. 8 shows, on a larger scale, the portion that is indicated as F8 in FIG. 7.
Figure 9:
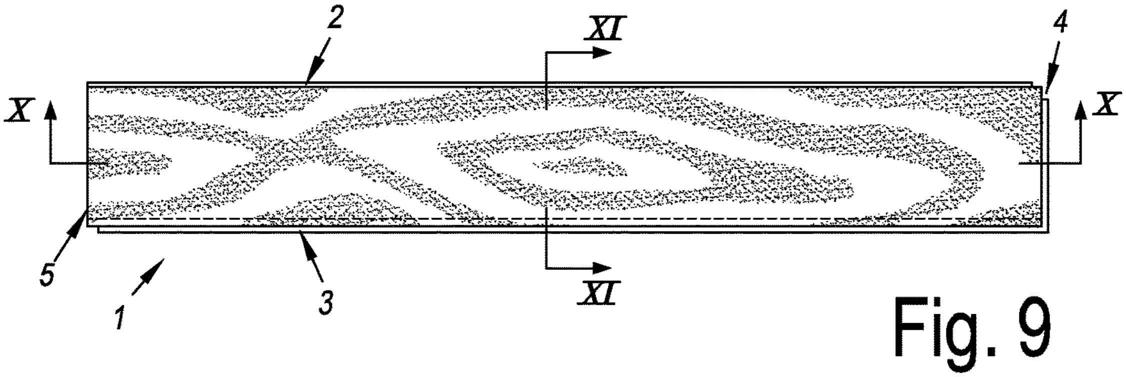
FIG. 9 shows a top view of a floor panel from the floor covering in FIGS. 7 and 8.
Figure 10:
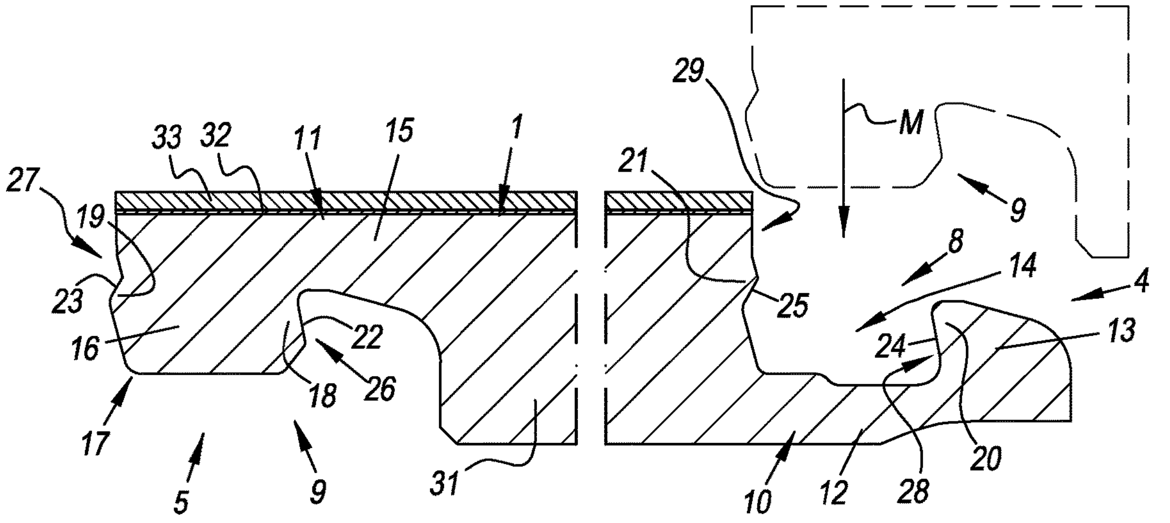
FIGS. 10 and 11 show, on a larger scale, cross sections according to cross sections X-X and XI-XI, respectively, in FIG. 9.
Figure 11:
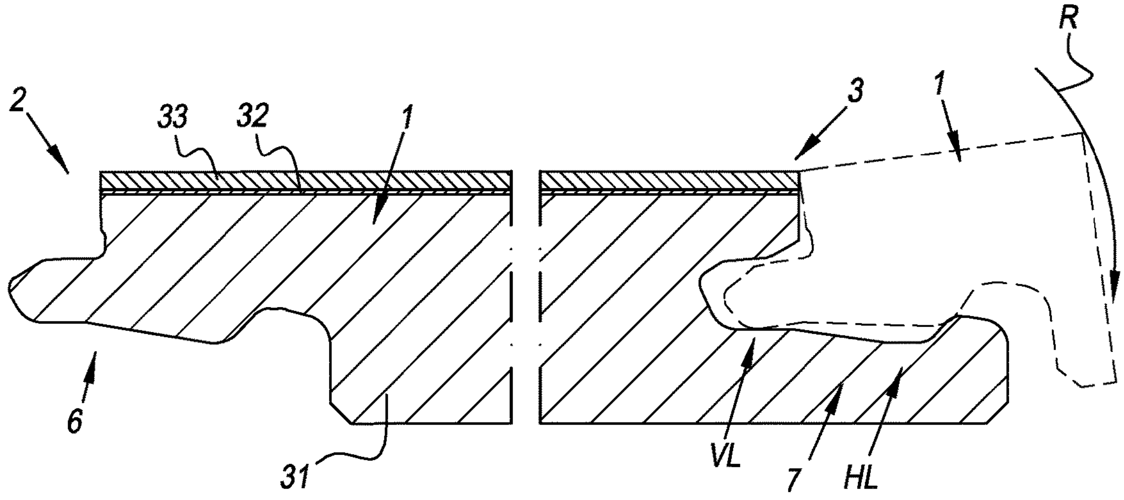

FIG. 7 shows, schematically and in perspective, a portion of a floor covering that consists of floor panels according to the invention. FIG. 8 shows on a larger scale the portion that is indicated with F8 in FIG. 7. FIG. 9 shows a top view of a floor panel from the floor covering in FIGS. 7 and 8. FIGS. 10 and 11 show, on a larger scale, cross sections according to cross sections X-X and XI-XI respectively in FIG. 9. The panels comprise a substrate 31, a decorative layer 32 and a wear layer 33 according to the invention.

FIGS. 7 and 8 show floor panels 1 according to the invention for forming a floor covering. These floor panels 1 comprise a first pair of opposite edges 2-3 and a second pair of opposite edges 4-5.

The floor panels 1 shown are configured on their edges in such a way that they are mutually couplable according to the so-called fold-down principle, which is a principle that is known per se, and that consists in that said floor panels 1 can be coupled to each other on the first pair of edges 2-3 by a rolling motion R, and can be coupled to each other on the second pair of edges 4-5 by a downward motion M, wherein the downward motion M is a consequence of the rolling motion R and thus occurs substantially at the same time. The floor panels 1 are also configured on their edges 2-3 and 4-5 in such a way that finally locking occurs in the vertical direction V and in the horizontal direction H, the latter being perpendicular to the respective edges.

As shown in FIGS. 10 and 11, said floor panel 1 is provided for this purpose on its first pair of edges 2-3 with coupling parts 6-7, while on the second pair of edges 4, 5, coupling parts 8-9 are provided, said coupling parts being described in more detail hereunder with reference to FIGS. 10 and 11.

The coupling parts 8-9 of the second pair of edges 4-5 have, as can be seen in FIG. 10, at least the following basic features:

- the coupling parts 8-9 comprise a horizontally acting locking system, which in a coupled state of two of said floor panels 1 achieves locking in the plane of the floor panels 1 and perpendicular to the respective edges 4-5;
- the coupling parts 8-9 also comprise a vertically acting locking system, which in a coupled state of two of said floor panels 1 achieves locking transversely to the plane of the floor panels 1;
- the coupling parts 8-9 are mainly made from the material of the floor panel 1 itself;
- the horizontally acting locking system of the second pair of edges 4-5 is at least formed from an upward directed lower hook-shaped portion 10 that is located on one of the aforementioned two edges, in this case edge 4, as well as a downward directed upper hook-shaped portion 11 that is located on the opposite edge 5, wherein the lower hook-shaped portion 10 consists of a lip 12 with an upward directed locking element 13 which, proximally therefrom, defines a female part 14 in the form of a recess, whereas the upper hook-shaped portion 11 consists of a lip 15 with a downward directed locking element 16 that forms a male part 17;
- the coupling parts 8-9 are configured in such a way that two of said floor panels 1 can be coupled to each other on their respective edges 4-5 by means of a downward motion M of one floor panel relative to another;
- the vertically acting locking system comprises vertically acting locking parts 18-19-20-21 which define, by means of respective contact surfaces 22-23-24-25, at least one first contact zone and a second contact zone, which are located on either side of the male part 17 and the female part 14; the aforementioned vertically acting locking parts comprise a first locking part 18 and a second locking part 19 on the respective opposite sides 26-27 of the male part 17, as well as a third locking part 20 and a fourth locking part 21 on the respective opposite sides 28-29 of the female part 14, in other words on the sides that are located on either side of the recess that forms the female part;
- the first and third locking part 18 and 20 respectively define, in the coupled state of two of said floor panels 1, the aforementioned first contact zone, wherein they have contact surfaces 22 and 24 respectively, which in the coupled state define at least one inclined tangent;

the second and fourth locking part 19 and 21 respectively define, in the coupled state of two of said floor panels 1, the aforementioned second contact zone, wherein they have contact surfaces 23 and 25 respectively, which in the coupled state also define at least one inclined tangent;

the aforementioned male part 17 has a distal side 27 and a proximal side 26, wherein the second locking part 19 is located on the distal side 27; and the aforementioned two tangents are inclined upward toward each other from their respective contact zones.

The coupling parts 6-7 of the first pair of edges 2-3 have, as can be seen in FIG. 11, at least the following basic features:

the coupling parts 6-7 comprise a horizontally acting locking system HL, which in a coupled state of two of said floor panels 1 achieves locking in the plane of the floor panels 1 and perpendicular to the respective edges 2-3;

the coupling parts 6-7 also comprise a vertically acting locking system VL, which in a coupled state of two of said floor panels 1 achieves locking transversely to the plane of the floor panels, in other words in the vertical direction;

the coupling parts 6-7 are mainly made from the material of the floor panel 1 itself; and the coupling parts 6-7 are configured in such a way that two of said floor panels 1 can be coupled to each other on these edges by means of a rolling motion R.

FIGS. 7-11 illustrate the application of panels according to the invention as a floor panel. The panels according to the invention may, however, also be used for other applications. FIGS. 7-11 also illustrate coupling parts that panels according to the invention may comprise. In each of the examples of panels that are shown in FIGS. 2-6, coupling parts may be provided as illustrated in FIGS. 7-11. The coupling parts that may be applied are also not limited to those illustrated in the figures.

Comparative tests of decorative panels according to the invention were carried out, in which the carrier layer is a polyvinyl chloride film.

In a first test the polyvinyl chloride film comprised between 30-36 parts by weight of DOTP (dioctyl terephthalate, a plasticizer) and 1-4 parts by weight of ESBO (epoxidized soybean oil, a plasticizer). This polyvinyl chloride film had a hardness of 52 Shore D. The scratch resistance was measured by means of a sclerometer. The result was 6 newton.

In a second test the polyvinyl chloride film comprised between 10-20 parts by weight of DOTP (dioctyl terephthalate, a plasticizer); and no other plasticizers. This polyvinyl chloride film had a hardness of 75 Shore D. The scratch resistance was measured by means of a sclerometer. The result was more than 10 newton. In the sclerometer, a standardized diamond head is dragged over the test material. The compressive force with which the diamond head presses on the test material and generates a visible scratch is determined. The result of the second test is thus better than the result of the first test.

The present invention is by no means limited to the embodiments described above; the invention may be carried out according to several variants while remaining within the scope of the present invention.

The invention claimed is:

1. A decorative panel, wherein the decorative panel comprises a substrate and a wear layer, wherein the wear layer comprises a varnish coat, wherein the varnish coat comprises hard particles over an entire thickness, wherein the hard particles have an S50 particle size, wherein the S50 particle size, determined from a cumulative particle size distribution according to volume measured by laser diffraction, is the particle size at which 50% of the hard particles are smaller than this particle size S50; in that the varnish coat has a thickness T; and in that the thickness T of the varnish coat is between 0.5*S50 and 2*S50;

wherein the varnish coat is an acrylate varnish coat;

wherein the decorative panel comprises a decorative layer, wherein the decorative layer is located underneath the wear layer; wherein the decorative layer comprises a print; wherein the print is provided on a carrier;

wherein the wear layer comprises an additional layer, wherein the additional layer is located between the carrier and the varnish coat, wherein the additional layer comprises a polymer film;

wherein the wear layer forms a surface of the decorative panel, and comprises a texture, wherein the texture reaches at least into the additional laver;

wherein the texture is obtained by a pressing operation with a textured press element.

2. A decorative panel, wherein the decorative panel comprises a substrate and a wear layer, wherein the wear layer comprises a varnish coat, wherein the varnish coat comprises hard particles over an entire thickness, wherein the hard particles have an $50 particle size, wherein the S50 particle size, determined from a cumulative particle size distribution according to volume measured by laser diffraction, is the particle size at which 50% of the hard particles are smaller than this particle size S50; in that the varnish coat has a thickness T; and in that the thickness T of the varnish coat is between 0.5*850 and 2*S50;

wherein the varnish coat is an acrylate varnish coat;

wherein the acrylate varnish coat is obtained using at least 0.1 wt % of dendritic oligomer with an acrylate functionality of 5 or higher, wherein this percentage by weight is determined relative to a total weight of the varnish coat.

3. The decorative panel as in claim 1, wherein the S50 particle size is between 3 micrometers and 20 micrometers.

4. The decorative panel as in claim 1, wherein the hard particles have a particle size distribution according to volume wherein (S95−S5)/S50 is less than 2;

wherein S95 in the particle size distribution according to volume as determined by laser diffraction is the particle size at which 95% of the particles are smaller; and wherein S5 in the particle size distribution according to volume as determined by laser diffraction is the particle size at which 5% of the particles are smaller.

5. The decorative panel as in claim 1, wherein the hard particles have a particle size distribution according to volume wherein (S95−S50)/S50 is less than 1;

wherein S95 in the particle size distribution according to volume as determined by laser diffraction is the particle size at which 95% of the particles are smaller.

6. The decorative panel as in claim 1, wherein the varnish coat comprises between 2 and 15 wt % of hard particles.

7. The decorative panel as in claim 1, wherein the hard particles have a Mohs hardness higher than 7.

8. The decorative panel as in claim 1, wherein the hard particles comprise a silane coating.

9. The decorative panel as in claim 1, wherein a second varnish coat is located underneath the varnish coat;

wherein this second varnish coat is an acrylate varnish coat;

wherein this second varnish coat contacts the varnish coat; and wherein the second varnish coat does not comprise any particles with Mohs hardness higher than 7.

10. The decorative panel as in claim 1, wherein the additional layer comprises a polyvinyl chloride film, with a thickness between 20 micrometers and 550 micrometers.

11. The decorative panel as in claim 10, wherein the polymer film is a polymer film with a hardness of at least 60 Shore D.

12. The decorative panel as in claim 10, wherein the polymer film is a polyvinyl chloride film that comprises less than 20 wt % of plasticizer.

13. The decorative panel as in claim 1, wherein the comprises one or more of a wood fiber board, including an MDF board (Medium Density Fiberboard) or an HDF board (High Density Fiberboard);

a chipboard;

one or more layers of filled or unfilled polymer;

one or more layers that comprise a mineral matrix with fillers;

one or more layers of wood; or one or more resin-impregnated layers of kraft paper.

14. The decorative panel as in claim 1, wherein the panel comprises a first pair of opposite edges, including a first edge and a second edge, wherein the first pair of opposite edges comprises coupling parts, wherein these coupling parts comprise locking parts, so that the panel can be coupled with its first edge to the second edge of another such panel so that locking is obtained in the direction perpendicular to the plane of the panels thus coupled, and locking is obtained in a direction in a plane of the coupled panels perpendicular to the coupled panels.

* * * * *